3,036,932
DRYING AND CURING RESIN
TREATED TEXTILES
Jayant A. Masarguppi and Vasant B. Chipalkatti, Civil Lines, Delhi, India, assignors to Shri Ram Institute for Industrial Research, Delhi, India, a society of India
No Drawing. Filed May 7, 1958, Ser. No. 733,468
5 Claims. (Cl. 117—102)

This invention relates to the resin treatment of textile materials such as fibres, yarns, filaments or webs, fabrics, of cotton, rayon, wool or other artificial textile materials and in particular to the treatment of textile materials by resin precondensates made from urea or melamine and formaldehyde or made from reactive resins such as ethylene di-urea and formaldehyde or similar resins made from substituted urea and formaldehyde.

A simplified, illustrative flow diagram of the process is as follows:

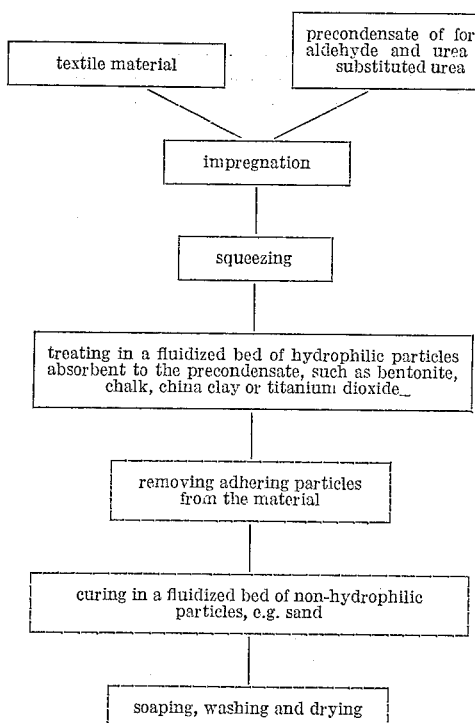

The art of treating textiles with resins made from urea or substituted urea and formaldehyde is fairly well known. One difficulty with all the hitherto known processes is caused by the deposition of unwanted resin on to the surface of fibres which make the fabrics hard, brittle and rough. Apart from the "hand" or "feel" of fabric being bad, the surface resin reduces the tear strength, abrasion resistance and tensile strength of the treated fabric.

One object of this invention is to remove substantially all of the surface resin unavoidably deposited during resin impregnation. Other objects are to facilitate the penetration of the crease-proofing agent and to obtain fabrics with softness and fullness normally desired.

Curing of resin treated materials by passage through fluidised beds of hot discrete particles has already been proposed. However, the material used for fluidised beds according to the said known practice consists of inert non-hydrophilic substances such as sand, glass beads etc. It has been found that when fluidised beds such as the above are used for resin curing, there does not occur any substantial advantage with respect to the deposition of surface resin, with the result that the handle of the material is still quite harsh.

It has been further found that the resin deposited on the surface of the textile or like material during padding can be removed by passing the said materials through a fluidised bed consisting of substances of hydrophilic nature which are employed in the form of fine discrete particles.

Such hydrophilic substances are characterised by the feature that these are capable of absorbing resin precondensate and thereby effectively remove the unwanted surface resin from the fabric. A few examples of such substances are bentonite, china clay, titanium oxide, and precipitated chalk. It has been also found out that though there is no need for fixing the lower limit of the particle size in the fluidised bed, generally the finer the particle size, the better the resin removal.

The resin precondensate bath may also contain any of the conventionally known catalysts such as ammonium, calcium or magnesium salts of inorganic acids, boric tartaric or acetic acid or other milder acids or latent catalysts such as hydrochlorides of mono-, di-, or triethanolamine or other known catalysts.

According to the present invention the process of treating the textile material is characterised in that the said material impregnated with a precondensate of urea or substituted urea and formaldehyde and squeezed to obtain about 80 to 100% squeeze is passed through a fluidised bed of hot discrete solid particles of a hydrophilic material such as bentonite, chalk, china clay, or titanium oxide whereby the excess resin on the surface of fabric is absorbed by the said hydrophilic material and simultaneously the material gets dried. The temperature of the bed is kept at 90° to 160° C. The time of treatment varies from 10 seconds to 60 seconds or even more depending on the type of fabric, and/or the nature of resin. The textile material which comes out of the fluidised bed is completely coated with fine particles of bentonite or chalk which have absorbed excess resin. These particles may be removed from the fabric by brushing, the brushed and dusted fabric being thereafter cured in another fluidised bed of solid discrete particles which consists of 40 to 60 mesh sand. The temperature of the second bed varies from 120° to 190° C., and the time of treatment from 20 to 60 seconds. The cured material is thereafter soaped and washed in the normal manner.

The invention is illustrated by means of the following examples:

*Example 1*

To the urea formaldehyde precondensate prepared from urea 100 gm., formaldehyde (35%) 230 cc. and ammonium hydroxide (0.88) 10 cc., were added 10.75 gms. of ammonium dihydrogen phosphate, 3.5 gm. of a conventional softening agent, 3.5 gm. of a conventional dispersing agent and 400 cc. of water and the solution was thoroughly mixed. This constituted the treating bath at a pH of 5. Bleached mercerised cotton drill was dipped in the said bath and squeezed to 80% squeeze, two dips and two nips were given. The thus impregnated fabric was dried by passing through a fluidised bed consisting of discrete solid particles of bentonite (particle size 100 to 150 mesh) at a temperature of about 120° C. for 20 seconds. The fabric was then brushed and dusted to remove the bentonite particles adhering to the surface of the fabric. The brushed and dusted fabric was then cured by passage through a second fluidised bed which consisted of sand particles of 40 to 60 mesh. The temperature of the second bed was 165° C. and the time of curing was 20 seconds. The cured sample was soaped, washed and dried, in the conventional manner.

The treated fabric so obtained has a soft firm hand.

The dry add-on was 8%, the crease recovery was 65 percent. There was no tensile loss in the fabric due to above treatment.

The following is an example of the existing practice:

Example 2

Again drill fabric was treated as in Example No. 1 except that the resin impregnated fabric was dried at 100° C. in an air oven and the thus dried fabric was cured at 140° C. for 5 minutes in an air oven. The dry add-on was 13% and the crease recovery was 63%. However, in this case there was a tensile loss of 24%.

Having now particularly described and ascertained the nature of our said invention and in what manner the same is to be performed, we declare that what we claim is:

1. A process for the treatment of a textile material impregnated with a precondensate of formaldehyde and at least one compound selected from the group consisting of urea and substituted ureas, comprising squeezing the material to about 80 to 100% squeeze and passing the squeezed material through a fluidised bed of hot discrete solid precondensate-absorbing hydrophilic particles of at least one hydrophilic substance selected from the group consisting of bentonite, chalk, china clay and titanium dioxide, said fluidised bed being maintained at a temperature between 90 and 160° C. and the squeezed material being present in said bed for a period of time between approximately 10 and 60 seconds, whereby excess precondensate on the surface of said material is absorbed by said particles and the surface of said material is simultaneously dried.

2. A process as in claim 1; wherein said hydrophilic particles have a size ranging from 147 to 104 microns.

3. A process as in claim 1; further comprising the step of removing any of said particles adhering to the surface of said material following the passage of the latter through said fluidised bed.

4. A process as in claim 1; further comprising the step of passing the material through a second fluidised bed of hot discrete solid non-hydrophilic particles following passage of the material through the first mentioned bed of hydrophilic particles, whereby the precondensate remaining in the material is cured during passage through said second fluidised bed.

5. A process as in claim 4; wherein said second fluidised bed consists of sand at a temperature between 120 and 190° C., and the material is present in said second fluidised bed for a period of time between 20 and 60 seconds.

References Cited in the file of this patent

UNITED STATES PATENTS

| | | |
|---|---|---|
| 2,739,908 | Marsh | Mar. 27, 1956 |
| 2,785,478 | Audas et al. | Mar. 19, 1957 |
| 2,956,903 | Spencer | Oct. 18, 1960 |